United States Patent
Hsu et al.

(10) Patent No.: US 6,577,444 B2
(45) Date of Patent: Jun. 10, 2003

(54) METHOD FOR IMAGE-BASED ILLUMINATION EFFECT IN A THREE-DIMENSIONAL SCENE

(75) Inventors: Shu-Fang Hsu, Taipei (TW); Kuang-Rong Lu, Kaohsiung (TW)

(73) Assignee: Ulead Systems, Inc., Taipei (TW)

( * ) Notice: Subject to any disclaimer, the term of this patent is extended or adjusted under 35 U.S.C. 154(b) by 6 days.

(21) Appl. No.: 09/858,695

(22) Filed: May 16, 2001

(65) Prior Publication Data
US 2002/0015227 A1 Feb. 7, 2002

(30) Foreign Application Priority Data
Aug. 3, 2000 (TW) .......................... 89115594 A

(51) Int. Cl.[7] .......................... G02B 27/22; G06T 15/50; G06T 15/00
(52) U.S. Cl. .......................... 359/462; 345/426; 345/419; 382/154
(58) Field of Search .......................... 359/462, 472; 345/419, 420, 422, 426, 629, 634; 382/154, 174

(56) References Cited

U.S. PATENT DOCUMENTS

| | | | | |
|---|---|---|---|---|
| 6,057,850 A | * | 5/2000 | Kichury | 345/419 |
| 6,203,431 B1 | * | 3/2001 | Miyamoto et al. | 345/419 |
| 6,342,887 B1 | * | 1/2002 | Munroe | 345/426 |

\* cited by examiner

Primary Examiner—Audrey Chang
(74) Attorney, Agent, or Firm—Birch, Stewart, Kolasch & Birch, LLP

(57) ABSTRACT

A method for an image-based rendering of light in a virtual volume is disclosed, which can provide various lighting effects in the two-dimensional image of a three-dimensional object. Furthermore, the virtual light source can be located at any position corresponding to the three-dimensional object. The light sources in the image are divided into two groups, i.e., the light sources in the rear of the three-dimensional object and the light sources in the front of the three-dimensional object. Then, each image for the illuminating effects of the light sources in the rear of the three-dimensional object is merged in sequence. The merged image of all of the light sources in the rear of the three-dimensional object is merged with the image of the three-dimensional object. Thereafter, each image for the illuminating effects of the light sources in the front of the three-dimensional object is merged in sequence. The merged image of all of the light sources in the front of the three-dimensional object is provided with various effects by calculation with special functions. The merged image having various effects is finally merged into the merged image of the image for the illuminating effects of the light sources in the rear of the three-dimensional object and the image of the three-dimensional object to accomplish the image-based rendering of light for the three-dimensional object.

5 Claims, 4 Drawing Sheets

(1 of 4 Drawing Sheet(s) Filed in Color)

METHOD FOR IMAGE-BASED ILLUMINATION EFFECT IN A THREE-DIMENSIONAL SCENE

BACKGROUND OF THE INVENTION

1. Field of the Invention

The present invention relates in general to a method for producing an image. In particular, the present invention relates to a method for image-based rendering of light in a virtual volume.

2. Description of the Related Art

The images of a three-dimensional object are often used in industrial design, motion pictures, and even in virtual reality and homepage making, etc. The images may be enlivened by drawing them with a lightening effect. A conventional method for providing such a lightening effect includes the following steps: setting the position and the intensity from a virtual light source in the virtual space after drawing the image of a three-dimensional object; and calculating the distribution of light intensity while the light of the virtual light source illuminating the three-dimensional object, so that the image of the three-dimensional object is redrawn to show the lightening effect. This conventional light rendering method cannot provide various lightening effects since it only provides a virtual light source and then calculates the light intensity distribution of illumination of the light source on the object. Moreover, this conventional method is only applicable in case that the light source is located in the front of the object. If the light source is located in the rear of the object, only the shadow of the object can be observed.

SUMMARY OF THE INVENTION

Accordingly, an object of the present invention is to provide a method for image-based rendering of light in a virtual volume, which can provide various illuminating effects for a virtual three-dimensional object.

Another object of the present invention is to provide a method for image-based rendering of light in a virtual volume, in which the virtual light sources can be located at arbitrary positions, so that various illuminating effects can be provided to the virtual three-dimensional object.

In order to achieve the above objects, the present invention separates the light sources in the rear of and in the front of the object into two groups. The illuminating effects of the light sources in the rear of the object are first merged one-by-one. The merged image for the illuminating effects of the light sources is then merged with the image of the three-dimensional object. Thereafter, the images for the illuminating effects of the light sources in front of the object are sequentially merged. The merged image for the illuminating effects is calculated with a special function to obtain an image having a special effect. The image having a special effect is then merged with the merged image of the object and the illuminating effect of the rear light sources in a certain merging mode.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
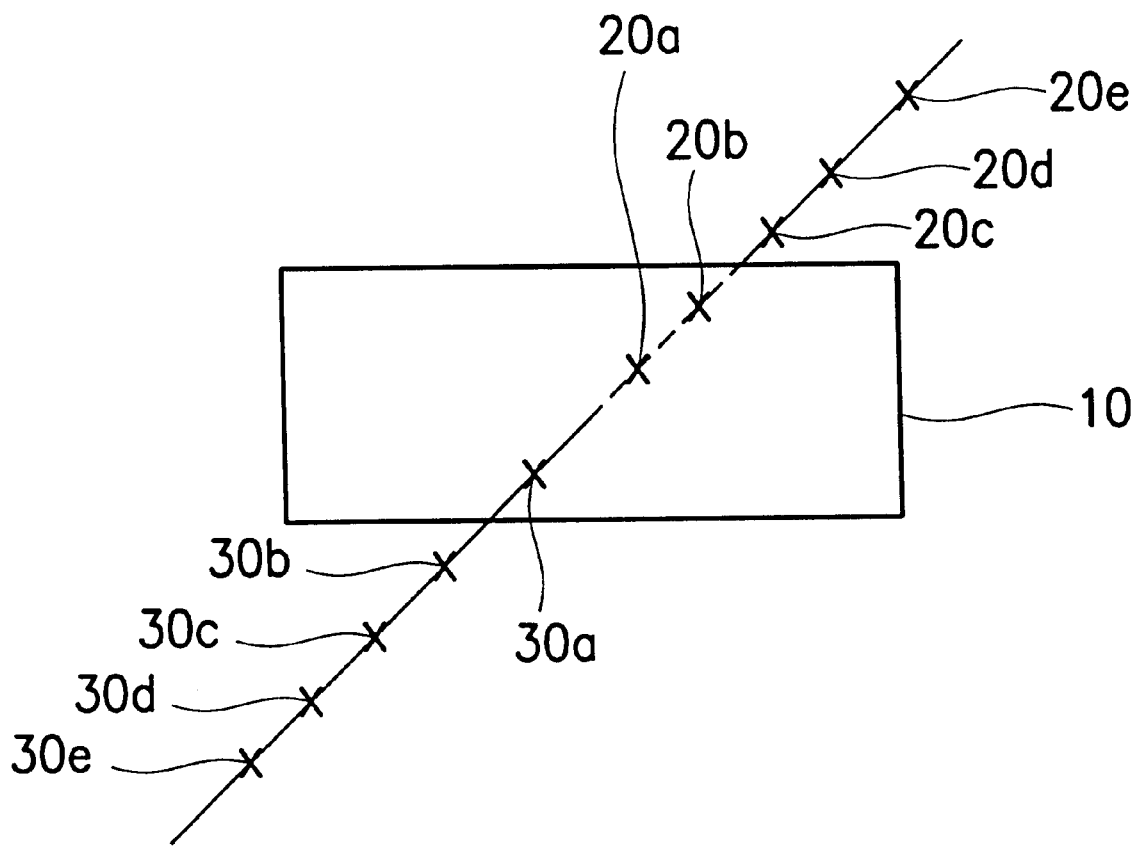
FIG. 1 is a diagram illustrating the method for image-based rendering of light in a virtual volume.

Referring to FIG. 1, according to the method for image-based rendering of light in a virtual volume of the present invention, the light sources in the virtual volume are divided into two groups, i.e., the light sources 20a~20e in the rear of the three-dimensional object 10 and the light sources 30a~30e in the front of the three-dimensional object 10. Then, each image for the illuminating effects of the light sources 20a~20e are merged in sequence. For example, the image for the illuminating effect of the light source 20e is merged with the image for the illuminating effect of the light source 20d to form a new image. The new image is then merged with the image for the illuminating effect of the light source 20c, and so forth. The merged image of all of the light sources in the rear of the three-dimensional object is merged with the image of the three-dimensional object. Thereafter, each image for the illuminating effects of the light sources 30a~30e are merged in sequence. The merged image of all of the light sources in the front of the three-dimensional object can be provided with various effects by calculated with special functions. The merged image having various effects is finally merged into the merged image of the image for the illuminating effects of the light sources in the rear of the three-dimensional object and the image of the three-dimensional object to accomplish the image-based rendering of light for the three-dimensional object.

Figure 2A:
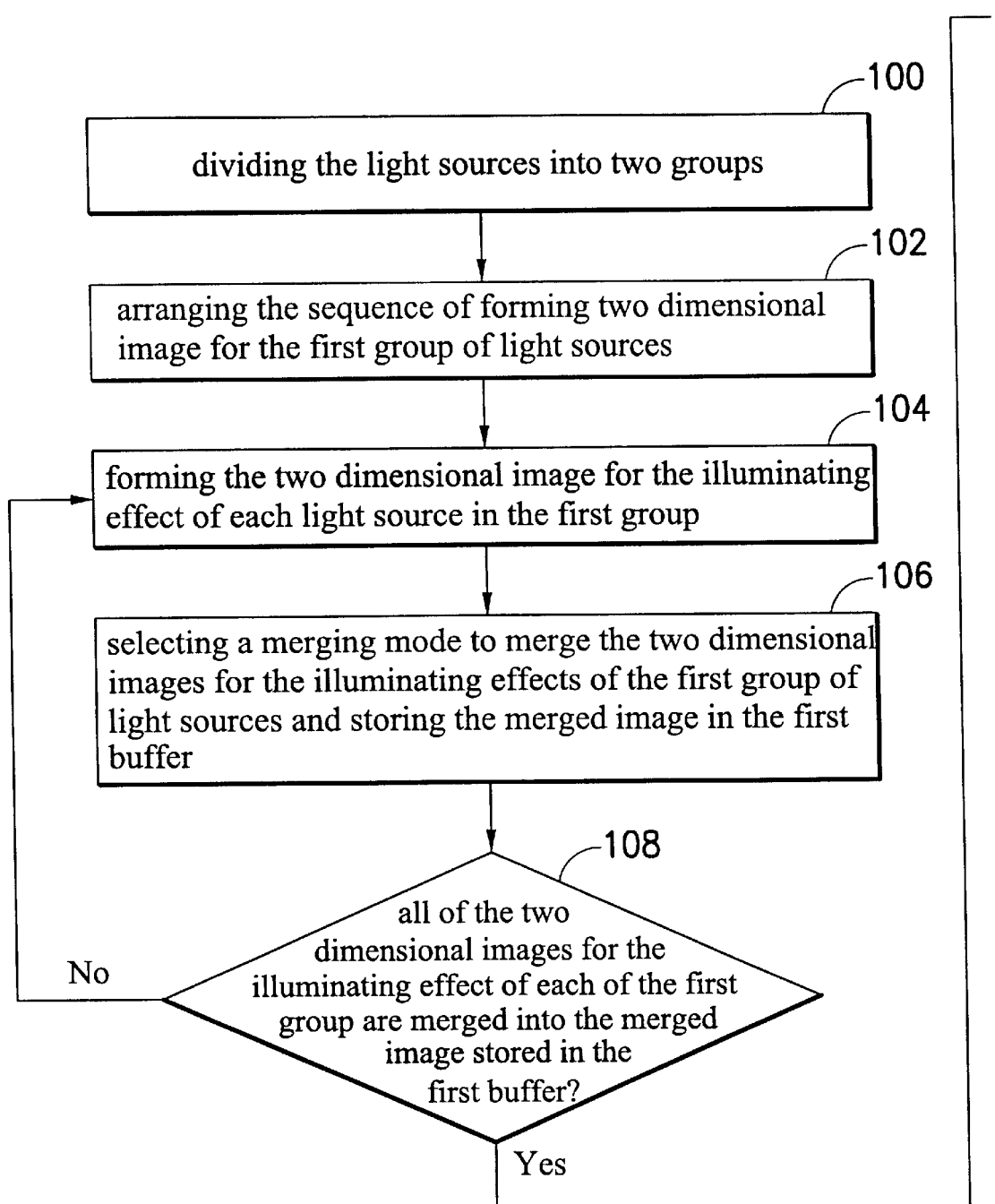
FIGS. 2a and 2b are flow charts illustrating the method for image-based rendering of light in a virtual volume.
Figure 2A:
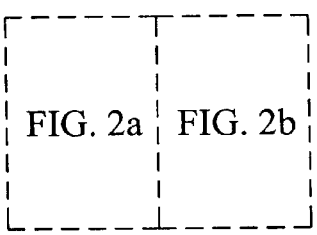
Figure 2B:
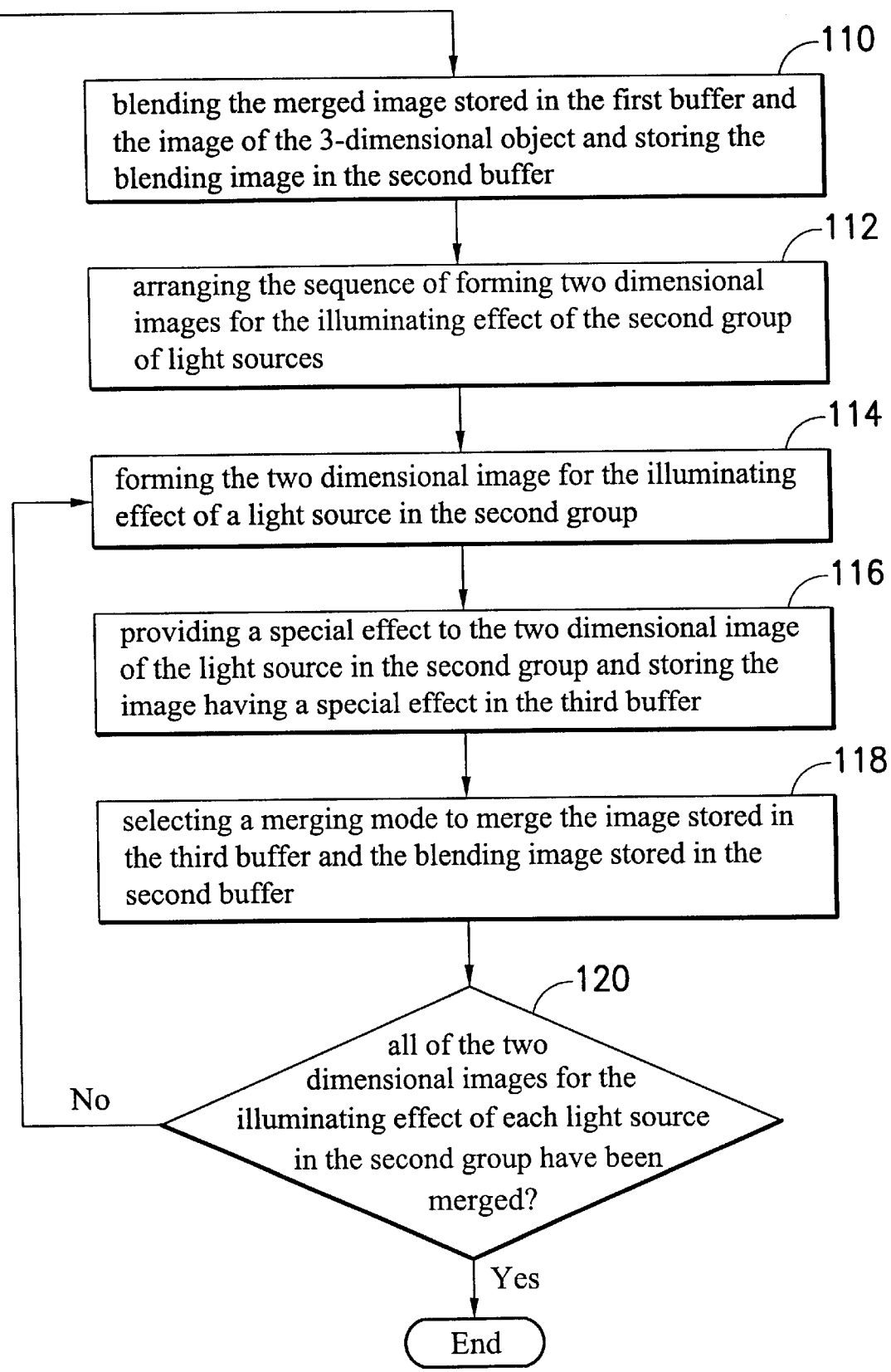

Referring to FIG. 2, the method of this invention includes the steps of: (i) step 100, dividing the light sources into two groups, in which the first group is in the rear of the three-dimensional object, and the second group is in the front of the three-dimensional object; (ii) step 102, arranging the sequence of forming a two-dimensional image for the first group of light sources; (iii) step 104, forming the two-dimensional image for the illuminating effect of each light source in the first group of light sources; (iv) step 106, selecting a merging mode to merge the two-dimensional images for the illuminating effects of the first group of light sources and storing the merged image in the first buffer; (v) step 108, determining whether or not each of the two-dimensional images for the illuminating effect of each of the first group of light sources are merged into the merged image stored in the first buffer, if yes go to next step, otherwise go to step 104; (vi) step 110, blending the merged image stored in the first buffer and the image of the three-dimensional object to obtain a blending image and storing the blending image in the second buffer; (vii) step 112, arranging the sequence of forming two-dimensional images for the illuminating effect of the second group of light sources; (viii) step 114, forming the two-dimensional image for the illuminating effect of a light source in the second group of light sources; (ix) step 116, providing a special effect to the two-dimensional image of the light source in the second group of light sources by calculated with a special function and storing the image having a special effect in the third buffer; (x) step 118, selecting a merging mode to merge the image stored in the third buffer and the blending image stored in the second buffer; (xi) step 120, determining whether or not the two-dimensional images for the illuminating effect of each light source in the second group of light sources have been merged, if yes go to the end, otherwise go to step 114.

Various merging modes, such as blending mode, addition mode, lighting mode, multiple mode, inverse of multiple mode, hue mode, etc., can be used based on which effect is desired. The various merging modes are described here.

Always Mode (Blending)

$$Result(R)=F(R) \times Mask+B(R) \times (1.0-Mask)$$

$$Result(G)=F(G) \times Mask+B(G) \times (1.0-Mask)$$

$$Result(B)=F(B) \times Mask+B(B) \times (1.0-Mask)$$

Addition Mode $$Result(R)=F(R)+B(R)$$

$$Result(G)=F(G)+B(G)$$

$$Result(B)=F(B)+B(B)$$

Lighting Mode

If $(F(R) \geq 128)$ $$Result(R)=B(R)+127 \times F(R)/255;$$

Else $$Result(R)=B(R)-127 \times F(R)/255.$$

If $(F(G)>128)$ $$Result(G)=B(G)+127 \times F(G)/255;$$

Else $$Result(G)=B(G)-127 \times F(G)/255.$$

If $(F(B)>128)$ $$Result(B)=B(B)+127 \times F(B)/255;$$

Else $$Result(B)=B(B)-127 \times F(B)/255.$$

Multiple Mode $$Result(R)=F(R) \times B(R)/255$$

$$Result(G)=F(G) \times B(G)/255$$

$$Result(B)=F(B) \times B(B)/255$$

Inverse of Multiple Mode $$Result(R)=255-(255-F(R)) \times (255-B(R))/255$$

$$Result(G)=255-(255-F(G)) \times (255-B(G))/255$$

$$Result(B)=255-(255-F(B)) \times (255-B(B))/255$$

Hue Mode $$Result(H)=F(H)$$

$$Result(S)=B(S)$$

Where
  F: foreground image
  B: background image
  R, G, B: red, green and blue
  H, S, B: hue, saturation and brightness Each image has 3 plans, that is, R, G and B plans.

$0 \leq R, G, B \leq 255$ $0.0 \leq Mask \leq 1.0$

Figure 3A:
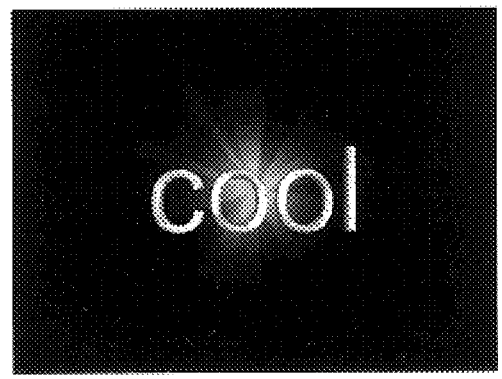
FIGS. 3a to 3c are pictures for illustrating the method for image-based rendering of light in a virtual volume according to a preferred embodiment of this invention.
Figure 3B:
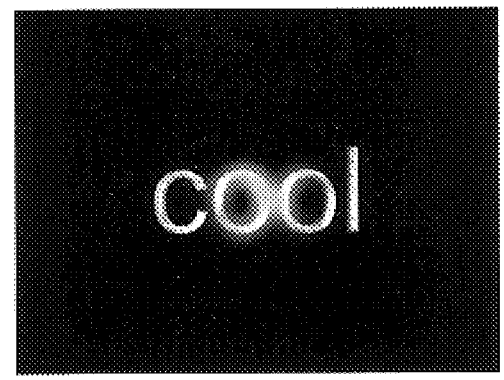
Figure 3C:
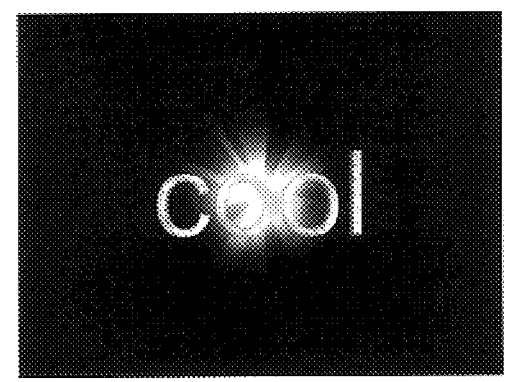

Various merging effects can be obtained by using various merging modes. Referring to FIGS. 3a to 3c, FIG. 3a is the merged image for the illuminating effects of the light sources in the rear of the three-dimensional object by using the addition mode. FIG. 3b is the merged image of the image, which is calculated with a special function, for the illuminating effects of the light sources in the front of the three-dimensional object and the image of the three-dimensional object. FIG. 3c is the merged image of the image of FIG. 3a and the image of FIG. 3b. According to FIGS. 3a to 3c, the method of this invention can render a light source at any position in the rear of or in the front of the three-dimensional object, and can apply various special functions to provide various lighting effects.

Various special functions can be used according to what effect is desired. For example, the special function used in the above embodiment can be a Gaussian function or a noise function to provide a halo effect or a wavelike effect to the image of the front light sources. The method of this invention can easily provide a various and lively lighting effect to the two-dimensional image of a three-dimensional object.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for image-based illumination effect in a three-dimensional scene, comprising the following steps of:

(i) dividing light sources into two groups, in which a first group is behind a three-dimensional object, and a second group is in front of the three-dimensional object;

(ii) arranging a first sequence for the light sources in the first group, wherein the first sequence is arranged based on Z-axis locations thereof, from far to near, with respect to a user viewpoint;

(iii) image rendering two-dimensional images for each of the light sources in the first group;

(iv) merging the two-dimensional images for each of the light sources in the first group into a first merged image according to the first sequence;

(v) blending the the first merged image and an image projected from the three-dimensional object to obtain a blended image;

(vi) arranging a second sequence for the light sources in the second group, wherein the second sequence is arranged based on Z-axis locations thereof, from far to near, with respect to a user viewpoint;

(vii) image rendering two-dimensional images for each of the light sources in the second group;

(viii) merging the two-dimensional images for each of the light sources in the second group into a second merged image according to the second sequence; and (ix) blending the second merged image and the blended image obtained in step (v).

2. The method as claimed in claim 1 wherein the step (viii) and (x) are carried out in one of blending mode, addition mode, lighting mode, multiple mode, inverse of multiple mode and hue mode.

3. The method as claimed in claim 1 further applying a special function to the two-dimensional images for each of the light sources in the first group and the second group.

4. The method as claimed in claim 3 wherein the special function is a Gaussian function.

5. The method as claimed in claim 3 wherein the special function is a noise function.

* * * * *